Sept. 2, 1924.

C. E. HANCOCK

COMBINATION DELIVERY CAR AND SAW RIG

Filed March 18, 1924    4 Sheets-Sheet 2

1,507,115

Inventor:
C. E. Hancock

Witness:

Sept. 2, 1924.
C. E. HANCOCK
1,507,115
COMBINATION DELIVERY CAR AND SAW RIG
Filed March 18, 1924    4 Sheets-Sheet 3
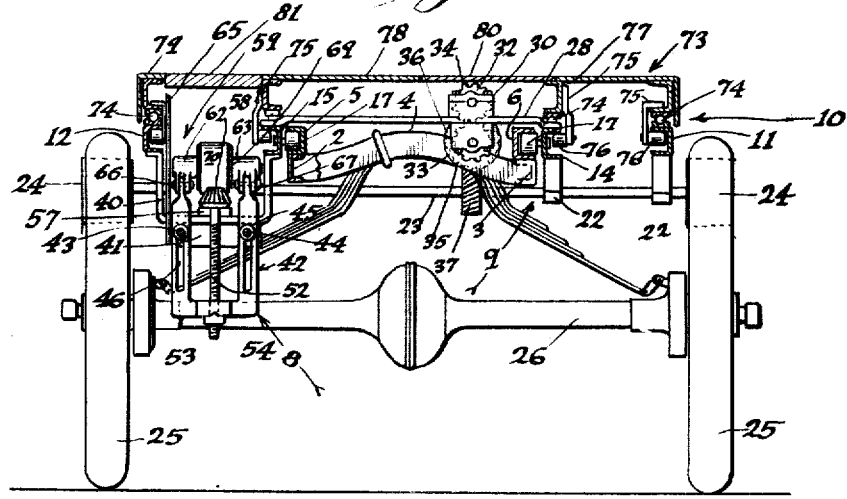
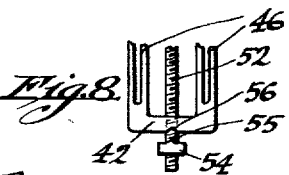
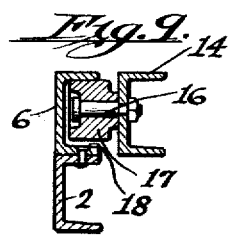
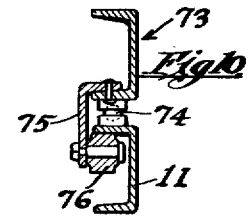
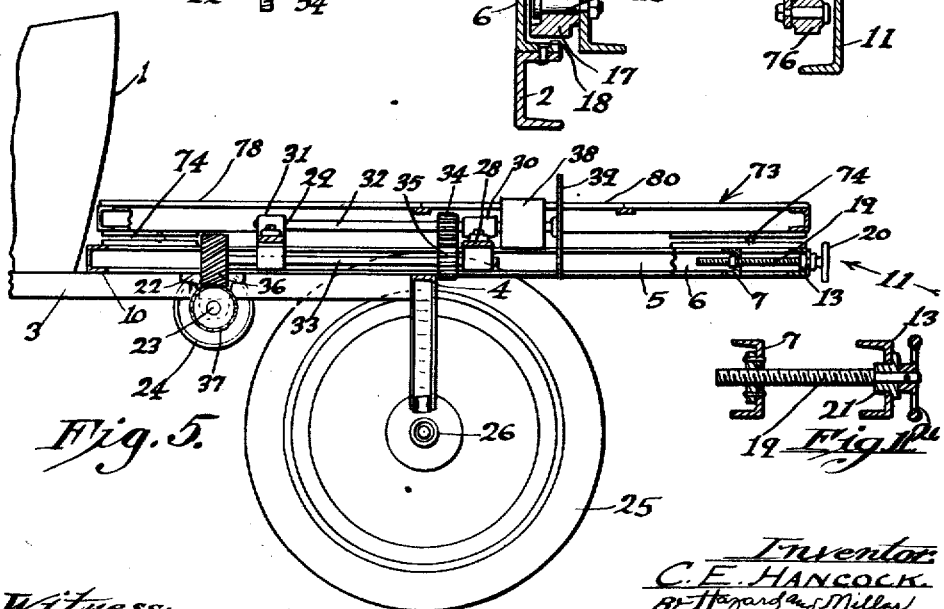

Sept. 2, 1924.  
C. E. HANCOCK  
COMBINATION DELIVERY CAR AND SAW RIG  
Filed March 18, 1924 4 Sheets-Sheet 4
1,507,115
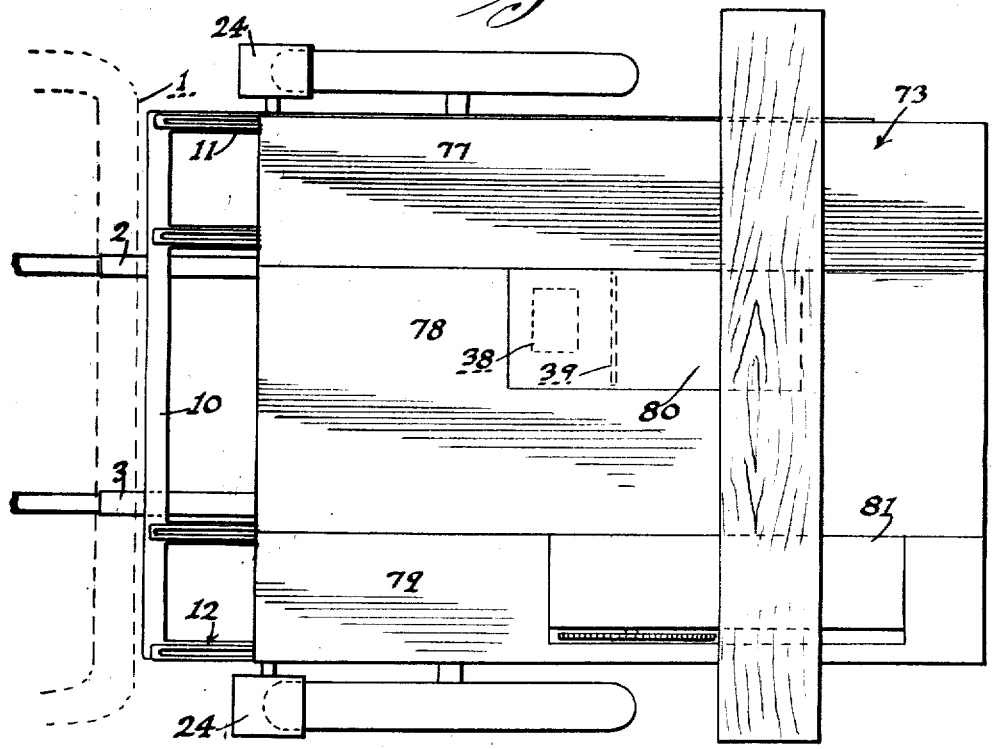
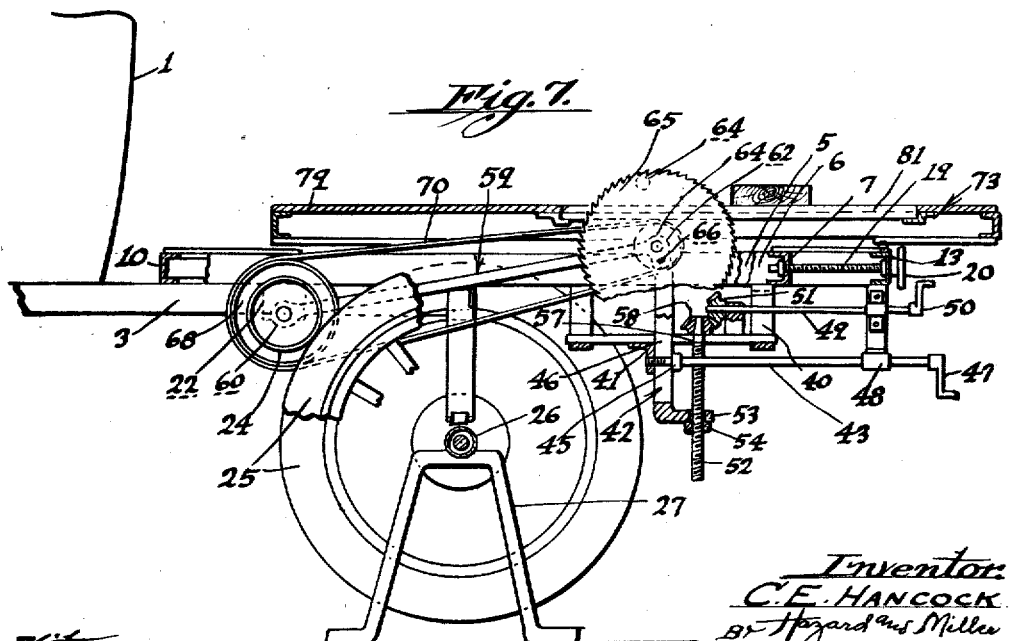
Inventor  
C. E. Hancock Patented Sept. 2, 1924.

1,507,115

UNITED STATES PATENT OFFICE.

CHARLES E. HANCOCK, OF BELL, CALIFORNIA, ASSIGNOR OF ONE-HALF TO DANIEL L. MOORE, OF BELL, CALIFORNIA.

COMBINATION DELIVERY CAR AND SAW RIG.

Application filed March 18, 1924. Serial No. 700,058.

*To all whom it may concern:*

Be it known that I, CHARLES E. HANCOCK, a citizen of the United States, residing at Bell, in the county of Los Angeles and State of California, have invented new and useful Improvements in Combination Delivery Car and Saw Rigs, of which the following is a specification.

My invention relates to a combination delivery car and saw rig and consists of the novel features herein shown, described and claimed.

An object is to make a combination wood worker and delivery body on a motor vehicle, for contractors, carpenters, lumber yards, and the like.

Another object is to make a combination wood worker, delivery body and driver's compartment on a motor vehicle, and which, when in traveling condition, is very compact, so as to be driven in the usual way and have the appearance of a roadster with a delivery slip-on body.

Other objects and advantages will appear from the drawings and specification.

The drawings illustrate the invention.

Fig. 4 is a vertical cross section on the lines 4—4 of Figs. 1, 2 and 3.

Fig. 5 is a vertical longitudinal section substantially on the line 5—5 of Fig. 2 and on a plane parallel with Fig. 3.

Fig. 6 is a view analogous to Fig. 2 with the floor or cover parts in place.

Fig. 7 is a view analogous to Fig. 3 with the saw rig in operation.

Fig. 8 is an enlarged detail of the bracket and operating screw indicated by the arrow 8 in Fig. 4.

Fig. 9 is an enlarged detail cross section of the frames indicated by the arrow 9 in Fig. 4.

Fig. 10 is an enlarged cross sectional detail of the frames indicated by the arrow 10 in Fig. 4.

Fig. 11 is an enlarged sectional detail of the parts indicated by the arrow 11 in Fig. 5.

Fig. 12 is a perspective showing how a side board and wheel fender are attached together and adapted for removal when the saw rig is to be operated.

Figure 1:
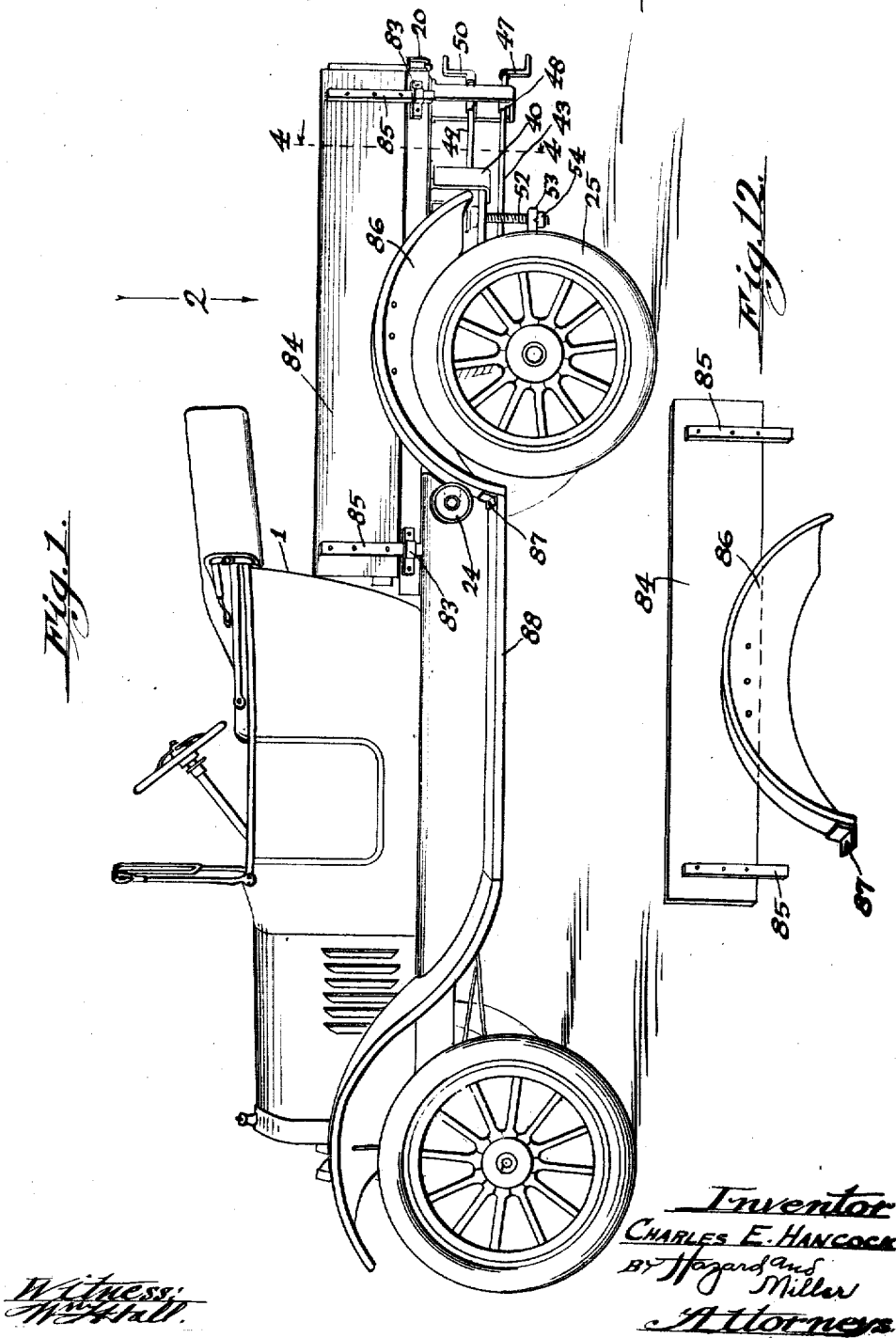
Figure 1 is a side elevation of a combination delivery car and saw rig, embodying the principles of my invention, with the parts arranged for traveling and to give the appearance of a roadster with a delivery slip-on body.

The details of the combination delivery car and saw rig are as follows:

In applying the invention to a motor vehicle such as a roadster automobile, I strip the back end of the automobile behind the back of the seat compartment down to the frame comprising the side bars 2 and 3 and the rear cross bar 4. A channel bar frame comprising side bars 5 and 6 and a rear end bar 7 is mounted upon the side bars 2 and 3 and rigidly secured thereto, preferably by welding spots of forward ends of the side bars 5 and 6 to the side bars 2 and 3. The side bars 5 and 6 extend a considerable distance back from the cross bar 4 and the cross bar 7 is at the extreme rear ends of the side bars 5 and 6 so as to materially enlarge or extend the rigid frame of the vehicle.

The bars 5, 6 and 7 are made up with the channel faces outwardly and the forward ends of the channels are closed to form stops 8 and 9. A second frame comprises a front bar 10, side bars 11 and 12, extending backwardly from the ends of the front bar 10, a rear bar 13 connecting the rear ends of the side bars 11 and 12, and intermediate side bars 14 and 15 connecting the end bars 10 and 13 parallel with the side bars 11 and 12. The intermediate side bars 14 and 15 are just outside of the side bars 5 and 6 and these bars are made up with their channels outwardly.

Spindles 16 are fixed in the central webs of the intermediate side bars 14 and 15 and carry rollers 17 running in the channels 18 of the side bars 5 and 6 so that the frame may be moved forwardly until the rollers 17 strike the stops 8 and 9 and so that the frame may be moved backwardly as far as desired.

A screw 19 is mounted through the bars 13 and 7 and has a hand wheel 20 upon its outer end and a nut 21 against the inner side of the bar 13, and screw seated through the bar 7 so that by manipulating the hand wheel 20 the frame carrying the rollers 17 may be moved forwardly and backwardly.

Figure 2:
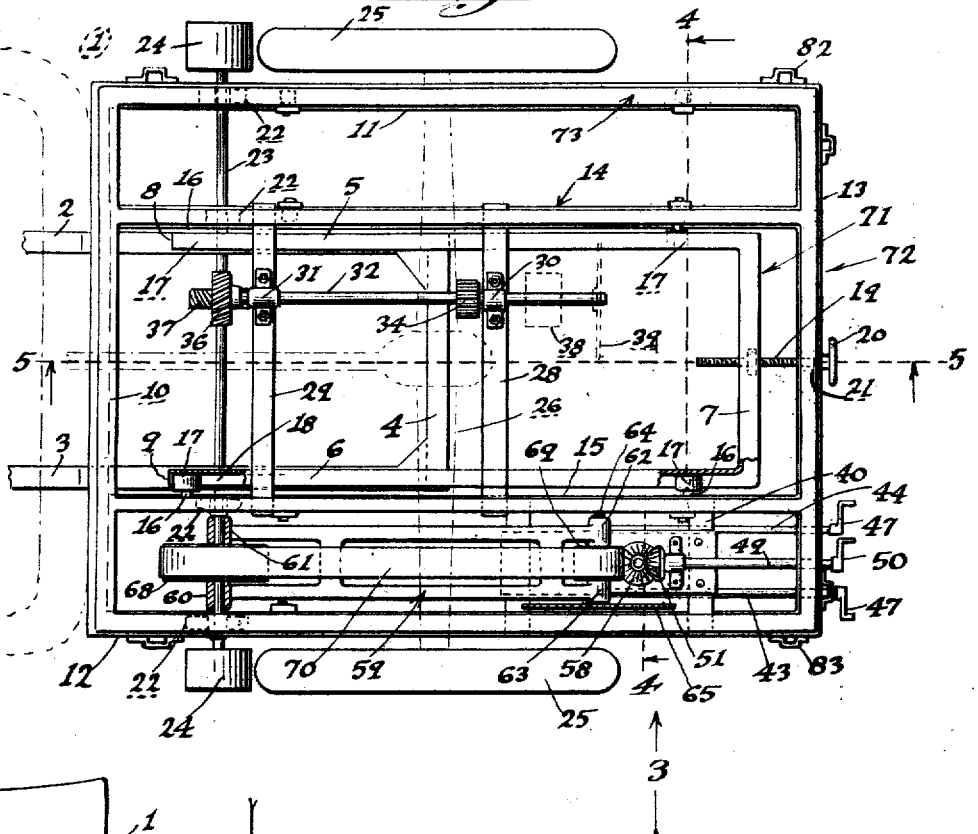
Fig. 2 is a top plan view of the mechanism and parts constituting the saw rig with the floor removed and as would be seen, looking in the direction indicated by the arrow 2 in Fig. 1 with the floor and side boards removed; the view also being taken looking downwardly as indicated by the arrow 2 in Fig. 3.

Bearing hangers 22 are secured to the bars 11, 14, 15 and 12 and project downwardly below the bars 2 and 3 and the drive shaft 23 is mounted in these hangers and has pulleys 24 upon its outer ends so that when the rollers 17 are in their forward positions as in Fig. 2, the pulleys 24 are spaced from the rear drive wheels 25 of the motor vehicle and so that when it is desired to drive the shaft 23 the rear axle 26 may be jacked up and mounted on benches 27 to hold the wheels 25 clear of the ground and then the hand wheel 20 may be operated to move the pulleys 24 into engagement with the wheels 25 and then if the vehicle engine is operated the shaft 23 will be driven to operate the saw rig.

Supporting bars 28 and 29 are mounted upon the bars 14 and 15 and extend over the bars 5 and 6. Bearings 30 and 31 are mounted upon the bars 28 and 29 and a shaft 32 is mounted in the bearings 30 and 31. A second shaft 33 is mounted below the shaft 32 and gears 34 and 35 connect the shafts 32 and 33, the object being to get the shaft 33 lower than the shaft 32 so that gears 36 and 37 will connect the shaft 33 to the shaft 23.

A joiner head 38 is mounted upon the rear end of the shaft 32 and a rip saw 39 is mounted upon the extreme rear end of the shaft 32 near the joiner head 38.

A frame 40 extends downwardly from the bars 12 and 15 and has a cross piece 41. A second frame 42 is slidingly connected to the cross piece 41 by rods 43 and 44, having stop heads 45 engaging the frame 42, the rods extending from the heads through slots 46 in the frame 42 and the screw threaded ends of the rods being screw seated through the cross piece 41 so as to make clamps to allow the frame 42 to be adjusted vertically to any desired position and then rigidly connected to the cross piece 41. Hand cranks 47 are fixed upon the rear ends of the rods 43 and 44 and hangers 48 extend downwardly from the bar 13 to support the rear ends of the rods 43 and 44. A shaft 49 is mounted parallel with the rods 43 and 44 and has a hand crank 50 on its rear end and a beveled gear 51 on its forward end. A screw 52 is mounted through a cross piece 53 at the lower end of the frame 42 and through a nut 54 having a projection 55 to engage in a slot 56 to hold the nut from rotating, and the upper end of the screw 52 is mounted in a bearing 57 supported by the frame 40, and a beveled gear 58 fixed upon the upper end of the screw 52 meshes with the beveled gear 51 so that by operating the handles 47 to loosen the frame 42 and operating the handle 50, the frame 42 may be raised or lowered relative to the frame 40.

The radius frame 59 has bearings 60 and 61 upon the shaft 23 and bearings 62 and 63 on its other end. A saw spindle 64 is mounted in the bearings 62 and 63 and a cross cut saw 65 is fixed upon one end of the spindle 64. The bearings 62 and 63 are connected to the upper ends of the frame 42 by pins 66 and 67, the pins being loose enough in the bearings 62 and 63 to allow the frame 42 to move straight up and down while the bearings 62 and 63 move concentric to the shaft 23.

A pulley 68 is fixed upon the shaft 23 between the bearings 60 and 61, a pulley 69 is fixed upon the spindle 64 between the bearings 62 and 63 and a belt 70 runs around the pulleys 68 and 69 to operate the saw 65.

Figure 3:
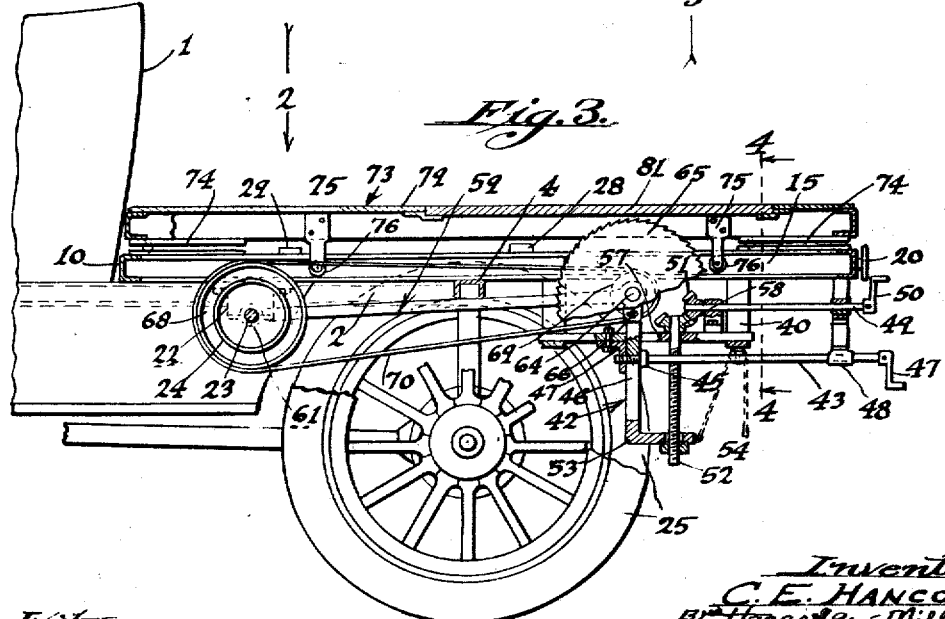
Fig. 3 is a mutilated sectional elevation on a plane parallel with Fig. 1 and as seen looking in the direction indicated by the arrow 3 in Fig. 2.

By manipulating the handles 47 and 50 the saw may be raised from the lower position shown in Fig. 3 to the upper position shown in Fig. 7 for operating the saw, and when desired the handles 47 and 50 may be still further operated to raise the spindle 64 to the position shown in dotted lines in Fig. 7, and a drill may be connected to the end of the spindle either by removing the saw or not, so as to produce a drilling machine.

The frame, including the bars 5, 6 and 7 permanently mounted upon the car frame bars 2 and 3, forms an extension supporting frame 71. The bars 10, 11, 12, 13, 14 and 15 form the saw rig frame 72, said frame 72 being mounted to move upon the frame 71 to bring the saw rig frame driving pulleys into and out of engagement with the car wheels 25. When it is desired to operate the saw 65 or the drilling machine, the spindle 64 is raised as before suggested and the joiner head 38 and saw 39 are removed from the spindle 32 so as not to project upwardly and interfere with the work, and when it is desired to use the joiner head or saw they are replaced upon the spindle 32 and the saw spindle 64 and saw 65 are lowered so as not to interfere with the work.

The saw table frame 73 is constructed substantially like the frame 72 and ball bearings 74 are placed upon the frame 72 at various places to support the frame 73. Brackets 75 are secured to the bars of the frame 73 at various places and extend downwardly and have rollers 76 engaging in the channels of the bars of the frame 72 so as to hold the frame 73 in place.

The floor, consisting of the pieces 77, 78 and 79, is securely mounted upon the frame 73 and has a removable piece 80 for covering and uncovering the end of the shaft 32 and a removable piece 81 adjacent to saw 65 for providing access to the saw mechanism and this floor forms the bed of the delivery body when the saw rig is out of use.

Stake sockets 82 and 83 are fixed against the outer faces of the outer bars of the frame 73, side boards 84 have stakes 85 to fit in the sockets 82 and 83 and fenders 86 are secured to the side boards 84 and have angle brackets 87 to fit upon the foot boards 88 and be secured in place by bolts so that when the side boards and fenders are applied the car has the appearance of a roadster with a slip-on body, as shown in Fig. 1, and so that when it is desired to use the saw rig the brackets 87 are disconnected from the foot boards 88 and the side boards and fenders bodily removed.

Various changes may be made without departing from the spirit of my invention as claimed.

I claim:

1. An automobile having side frame bars and a rear cross bar, an extension frame permanently mounted upon the side frame bars and having a rear cross bar some distance back of the first cross bar, a saw rig frame mounted upon the extension frame, means for adjusting the saw rig frame forwardly and backwardly, a saw rig mounted upon the saw rig frame and having a driving shaft extending transversely, and pulleys upon the outer ends of the driving shaft adapted to run the saw rig by contact with the rear wheels of the automobile.

2. In a motor vehicle saw rig an extension frame adapted to be rigidly mounted upon the motor vehicle, a saw rig frame mounted upon the extension frame, means forming a longitudinally sliding connection between the saw rig frame and the extension frame, an adjusting screw mounted through the rear bar of the saw rig frame and screw seated through the rear cross bar of the extension frame, means for operating the screw to adjust the saw rig frame back and forth upon the extension frame, a driving shaft mounted transversely upon the saw rig frame, pulleys upon the outer ends of the shaft and adapted to engage the rear wheels of the motor vehicle when the saw rig frame is adjusted backwardly, and means for driving a tool from the shaft.

3. In a motor vehicle saw rig an extension frame adapted to be mounted permanently upon the motor vehicle, a saw rig frame adjustably mounted upon the extension frame, a saw carried by the saw rig frame, a saw table frame mounted to reciprocate upon the saw rig frame, a floor upon the saw table frame and having removable panels, a driving shaft transversely of the saw rig frame, and pulleys upon the outer end of the driving shaft so that the saw rig frame may be adjusted to bring the pulleys against the rear wheels of the motor vehicle and the rear axle may be jacked up and the device operated as a saw rig.

4. In a motor vehicle saw rig an extension frame permanently mounted upon the motor vehicle, a saw rig frame slidingly mounted upon the extension frame, a saw frame extending downwardly from the saw rig frame, a second saw frame connected to the first saw frame and adapted for vertical adjustment, a screw mounted in the second saw frame and extending through and resting upon a bearing in the first saw frame, a beveled gear upon the upper end of the screw, a horizontal shaft having a beveled gear meshing with the first beveled gear, and a hand crank upon the horizontal shaft so that by manipulating the hand crank the second saw frame may be raised or lowered.

5. In a motor vehicle saw rig an extension frame permanently mounted upon the motor vehicle, a saw rig frame mounted upon the extension frame and adapted to be adjusted longitudinally, a saw frame mounted upon the saw rig frame, a second saw frame having longitudinal vertical slots, crank shafts extending through the slots and screw seated in the first saw frame and having heads engaging the second saw frame, a screw connecting the second saw frame to the first saw frame, a beveled gear upon the screw, a hand crank shaft having a second beveled gear meshing with the first, a saw spindle mounted in the second saw frame, and a saw upon the saw spindle so that by manipulating the hand cranks the saw may be raised or lowered.

6. In a motor vehicle saw rig a saw rig frame mounted for adjustment longitudinally, a driving shaft mounted transversely in the saw rig frame, pulleys upon the ends of the driving shaft and adapted to be moved into and out of engagement with the rear wheels of the motor vehicle, means for adjusting the saw rig frame to move the pulleys into and out of engagement with the rear wheels, a radius frame mounted upon the shaft, a saw mounted at the swinging end of the radius frame, means for raising and lowering the saw, and a saw table mounted to reciprocate upon the saw rig frame.

In testimony whereof I have signed my name to this specification.

CHARLES E. HANCOCK.